(12) United States Patent
Mudge et al.

(10) Patent No.: US 6,360,404 B1
(45) Date of Patent: Mar. 26, 2002

(54) BREAK-AWAY BUCKLE

(76) Inventors: Mary Tenney Mudge, 151 Pullen Rd., Lexington, VA (US) 24450; Edgar C. Wood, Jr., 2004 Dr. Merritt Rd., Nathalie, VA (US) 24577-0127

( * ) Notice: Subject to any disclaimer, the term of this patent is extended or adjusted under 35 U.S.C. 154(b) by 0 days.

(21) Appl. No.: 09/489,741

(22) Filed: Jan. 21, 2000

(51) Int. Cl.[7] .......................... A44B 11/00; A44C 5/18; A01K 27/00
(52) U.S. Cl. .................. 24/3.4; 24/115 F; 24/265 WS; 24/602; 24/616; 24/597; 119/865
(58) Field of Search ............... 24/602, 3.4, 3.11, 24/115 F, 616, 265 WS, 71 J, 70 J, 597; 119/14.1, 865, 106

(56) References Cited

U.S. PATENT DOCUMENTS

| ,766,500 A | * | 8/1904 | Hatfield ...................... 119/865 |
| 2,513,592 A | * | 7/1950 | Silverman ..................... 24/616 |
| 3,430,601 A | * | 3/1969 | Thompson ................... 114/235 |
| 3,994,265 A | | 11/1976 | Banks |
| 4,541,151 A | * | 9/1985 | Herchenbach et al. . 24/265 WS |
| 4,562,623 A | * | 1/1986 | Jeswine ........................ 24/602 |
| 4,733,625 A | * | 3/1988 | Allen ........................... 24/602 |
| 5,020,196 A | | 6/1991 | Panach et al. |
| 5,443,039 A | * | 8/1995 | Suchowski ................... 119/865 |
| 5,564,131 A | | 10/1996 | Anscher |
| 5,774,957 A | * | 7/1998 | Kohl et al. .................... 24/616 |
| 5,791,297 A | | 8/1998 | Mudge |
| 5,988,927 A | | 11/1999 | Pfarr |

* cited by examiner

Primary Examiner—Victor N. Sakran
(74) Attorney, Agent, or Firm—Donavon Lee Favre

(57) ABSTRACT

The present invention is directed to a safety release break-away buckle designed for but not limited to pet collars and large animal halters, to separate at a predetermined magnitude of tension based upon a fraction of the animal's weight or strength, should the animal's collar or halter become entangled on a protrusion as to endanger the animal's health of life, as by strangulation, injury or entrapment. The release is obtained by pulling a lug through a restrictive pair of jaws. The safety release break-away buckle can also be the primary coupling device in a collar or halter.

12 Claims, 5 Drawing Sheets

BREAK-AWAY BUCKLE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention is directed to a break-away buckle designed primarily for pet collars and large animal halters. The break-away buckle has a safety release and also force free engagement and disengagement. Other uses are also contemplated for the break-away buckle.

Every animal that wears a conventional neck collar or head collar, as in the case of horses, is at risk of injury or death because of the danger of ensnarement on fixed protrusions such as tree branches or fence posts. Thoughtful owners often remove collars or halters on free running animals in order to prevent a tragedy. In the case of horses, often it is difficult to catch a horse unless the horse is wearing a halter. In the case of an untrained horse it is desirable to leave the halter on despite the obvious danger. In the case of dogs the danger is even greater as dogs are often required by law to wear a collar with rabies tags. Visible owner identification worn on a pet collar is also of significant importance. In any case the owners need a means of leaving collars and halters on without risk of death or injury caused by ensnarement. A collar or halter, releasable when subjected to sufficient tension is the means by which responsible owners can do this.

Many inventions have been made through the years to address this means. One common problem is one of insufficient adjustment for release based on the animals weight or strength or combination thereof. What would work for a cat would be unnecessarily weak for a large dog or horse. If the break-away strength of the collar or halter is too weak the animal could conceivably train itself to remove it. If the break-away strength of the collar or halter is too strong, the purpose of the break-away collar or halter is defeated.

Another problem is that many break-away mechanisms must be forced together in order to become disengaged. This is a problem when extreme physical force is necessary as in the case of a large dog or horse.

Some break-away devices are designed to separate properly under tension, but do not allow for release should the break-away device twist on its longitudinal axis or bend. In testing for this situation, there is always tension in addition to any torsion or any bending. A break-away device designed to pull straight apart, when subjected to bending or torsion often finds in it own geometry to require increased tension in order to separate.

Examples of break-away devices include:

U.S. Pat. No. 5,988,927 Pfarr (Nov. 23, 1999) at the abstract discloses "A breakaway system (10) for detachably connecting a tension transmitting belt (12) to a pin (20) includes a connector (24) having a pair of jaws (34a, 34b) that clamp against the sides of the pin to preload the connector to the pin thereby preventing relative motion between the jaws and the pin. When the tension load acting between the belt and pin exceeds a threshold level, the jaws of the connector spread sufficiently the allow the pin (20) to pass through an exit gap (42) at the ends of the jaws, which gap is of a nominal width that is smaller than the width of the pin."

U.S. Pat. No. 5,564,131 Anscher (Oct. 15, 1996) at the abstract discloses, "A buckle which includes a first member having a nipple around which a second member can rotate in the plane of the buckle. The buckle can advantageously be used to couple a back supporting belt to a shoulder strap of a pair of suspenders or the like. The rotational movement of one buckle member with respect to the other buckle member in the plane of the buckle facilitates adjustment of the shoulder straps to accommodate the various shoulder width of different wearers. The first and second members are adapted to break-away or decouple when the buckle is subjected to a load or force greater than a predetermined level." Like Pfarr above the nipple passes through an exit gap at the end of the jaws.

U.S. Pat. No. 3,994,265 Banks (Oct. 30, 1976) at the abstract discloses, "A safety collar for cats having an adjustable neck encircling band including a pressure releasable fastener. The fastener includes a socket type keeper member on one end of the band receiving a bolt member on the other end of the band. The keeper member has a restricted circular entrance including a radial slot opening into an internal cavity. The bolt member on one end has a ball larger than the circular entrance with a pin radially disposed in the ball and adapted to be received through the slot when the ball is forced through the entrance. The bolt at its other end is pivotably mounted in the band for aligning the pin with the slot for entry into the cavity and for release therefrom should the collar catch on some object, and for rotating the pin approximately normal to the slot for uses as a conventional leash." The above patent is representative of a large number of patents that disclose a break-away by pulling an object through a restricted opening.

U.S. Pat. No. 5,791,297 Mudge (Aug. 11, 1998) discloses at Column 3, lines 34 through 42, "Various sized break-away clips having various break-away tension can be designed for various sized dogs and other animals, such as cats. It is preferable that the break-away clip be separable upon the application of tension equal to of from 25% to 75% of the weight of the pet. The tension can be generated by torque on the base of one of the posts in the case of a twisting force causing the collar to act as a tourniquet."

Buckles and fasteners which involve inserting an elongated male member in a corresponding elongated opening in a female member and turning the male member so that it no longer registers with the opening in the female member include the following:

U.S. Pat. No. 5,020,196 Panach et al (Jun. 4, 1991) discloses at the abstract, "- - - a ninety degree fastener composed of two parts made of resistant material—the male part—there protrudes a round nucleous measuring the same as the width of the opening in the female part—when turning through 90 degrees in order to fasten."

BRIEF SUMMARY OF THE INVENTION

The present invention is directed to a break-away buckle that can be modified from strong to weak break-away force to suit the individual animal or situation. The break-away buckle is designed for use in safety collars and halters for pets and livestock, primarily but not limited to cats, dogs, horses, cows, llamas, donkeys and mules. The break-away buckle of the present invention can also replace buckles on articles of clothing and helmet straps. This will allow the article of clothing to be torn free in case of ensnarement by machinery, or ensnarement of a helmet in a motorcycle, equestrian, bicycle, industrial, or off the road vehicle accidents or any other helmet related accident.

The present invention is also directed to a break-away buckle that can swivel on the plane of its longitudinal axis to eliminate the bending problem and with mechanical means to keep the two halves aligned torsionally, tension can proceed to separate the two halves, thus providing a solution to the break-away problem. The break-away buckle of the present invention also eliminates the needs for force to engage the break-away buckle.

The break-away buckle consists of two halves designed to be connected or disconnected using non-interference inter-fitting geometric means which will maintain the connection while in use unless excessive tension causes the two halves to separate in accordance with the safety feature in the design for the safety of the animal. The combination of two major features, geometric non-interference engagement and twisting disengagement and/or tensional disengagement is a major advantage over the prior art. Also the ability of the two halves to swivel in the plane of the break-away buckle and still separate with tension or twisting force enables the break-away buckle to serve its safety related purpose in the event of a torsional or twisting force in addition to tension on the collar or halter as there is in cases of ensnarement on a fixed protrusion such as a fence post or tree branch. The swiveling feature aids to prevent a binding force on the break-away buckle which would require increased tension to release properly.

In order to accommodate for the extra length needed to close the break-away buckle of the present invention, one or both of the strap halves attached to the break-away buckle, connecting first and second ends of the strap, can be elastic or adjustable.

Highly trained dogs are used to assist the handicapped. There are times, when in order to save the highly trained dogs life, the dog must be released from the leash. In one case a handicapped person entered an elevator and the door closed with the dog outside of the elevator and on the leash with a disastrous result. Also a motorcycle rider, when thrown from the bike at high speed, can be decapitated by the helmet strap if the helmet gets caught on something. The break-away buckle of the present invention in the helmet strap could avoid decapitation or a fractured spine resulting in paralysis. Other persons wearing helmets also risk serious injury if the helmet is snagged by a moving object or the wearer falls or the helmet is caught in an overhanging branch.

The break-away buckle is constructed by detachably connecting first and second halves relative to each other. On half which is considered the first or male half contains a lug having a first end and a second end. The lug is mounted at the first end on the first halve. The lug has an outer contour and size. A non round keeper is mounted on a second end of the lug. A resilient clamp is mounted or the second or female halve, the clamp having a pair of spaced apart first and second jaws, the jaws cooperatively defining a resilient tip portion. An entrance gap is positioned at the resilient tip portion of the jaws. A non round opening is positioned in the resilient clamp, the non round opening being in communication with the entrance gap, the non round opening being dimensioned to receive the non round keeper of the lug. The entrance gap of the tip portion is contoured to be smaller than the outer contour and size of the lug, but sufficiently resilient to allow the lug to pass through when a predetermined tension is applied to the break-away connector.

To connect the first and second halves, the keeper of the non round lug of the male half is inserted into the non round opening of the female halve while the two halves are not aligned in normal use alignment. The two halves are then aligned into normal use alignment which throws the non round keeper and the non round opening out of alignment so that the keeper cannot be removed from the hole. The non round keeper has a length greater than the width of the non round opening when the non round opening and the non round keeper are in at least one area of non-alignment. The non round keeper and the non round hole can be oblong, square, star shaped, polygonal, oval or any other shape that would prevent the keeper from being retracted from the hole during non-alignment.

When the break-away buckle is in use the non round keeper and the non round opening are not in alignment which prevents the keeper from coming out of the opening in normal use. To separate the male and female halves the lug has to be forcibly pulled through the jaws. The male and female halves can also be separated by twisting. Twisting causes the plastic forming the hole and the plastic forming the keeper to deform sufficiently for the break-away buckle to break-away. To prevent accidental disengagement the non round keeper and the non round opening are perpendicular to one another when in use. Preferably the keeper is elongated and the non round opening is correspondingly elongated. The keeper is preferably symmetrical but can be non symmetrical such as pear shaped or a truncated geometrical shape such as a truncated circle. Preferably the lug outer contour has a round shape.

The break-away buckle of the present invention can be used in practically any application in which prior art buckles are used. A preferred use of the break-away buckle of the present invention is in a pet collar to prevent injury or strangulation of the pet. Another preferred use of the break-away buckle of the present invention is in an animal halter. Other uses include articles of clothing and a motorcycle helmet strap.

DETAILED DESCRIPTION OF THE INVENTION

Figure 1:
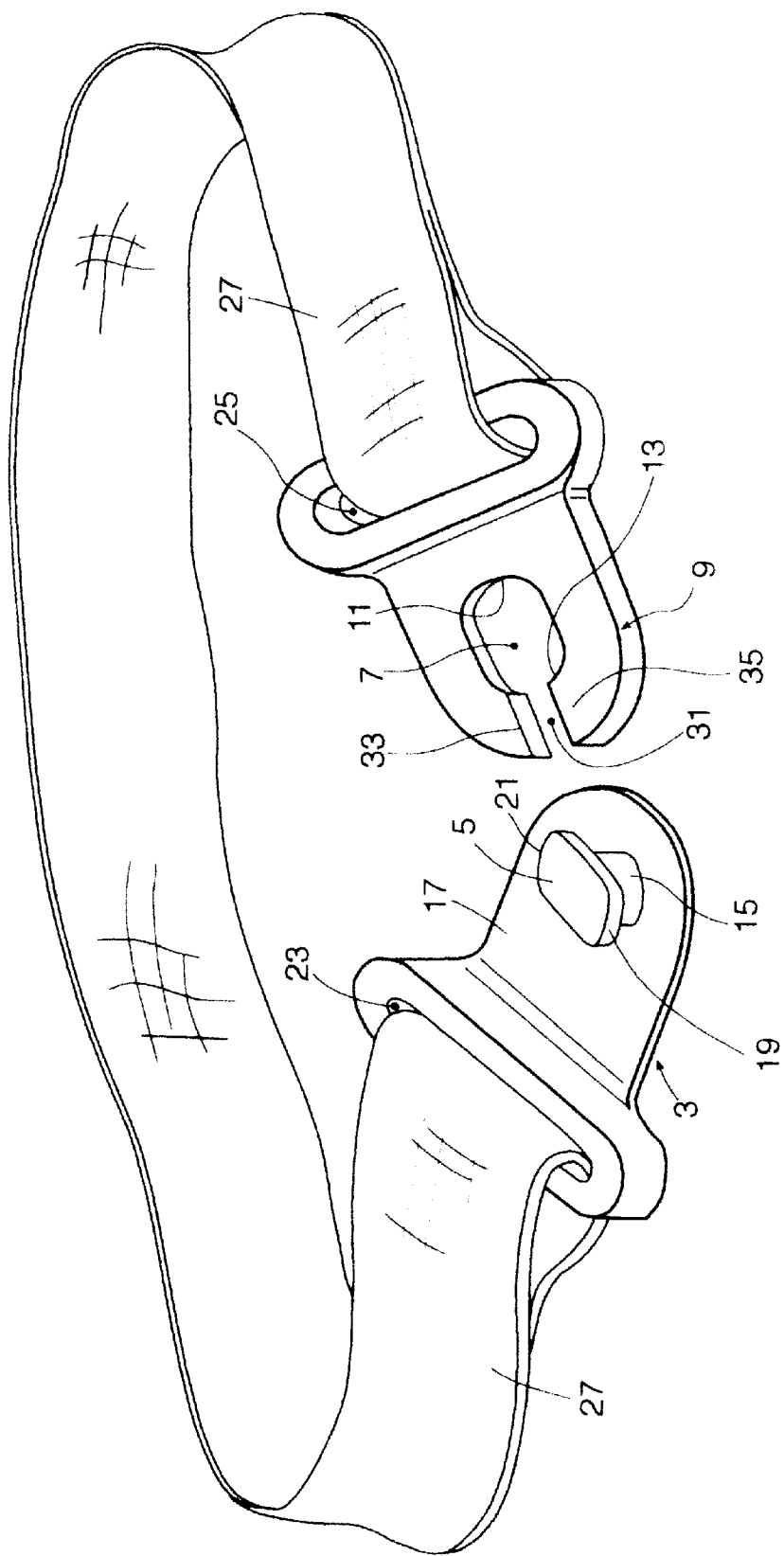
FIG. 1 is an isometric view of both halves of the break-away buckle of the present invention attached to a pet collar.
Figure 7:
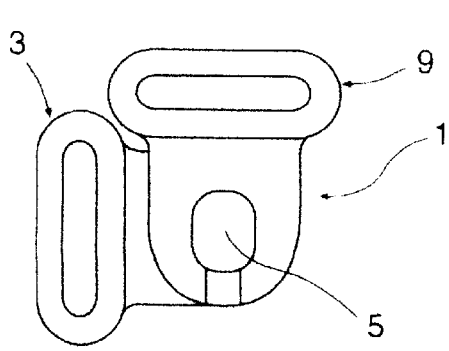
FIG. 7 is a top view of both halves in position for force free engagement or disengagement.
Figure 8:
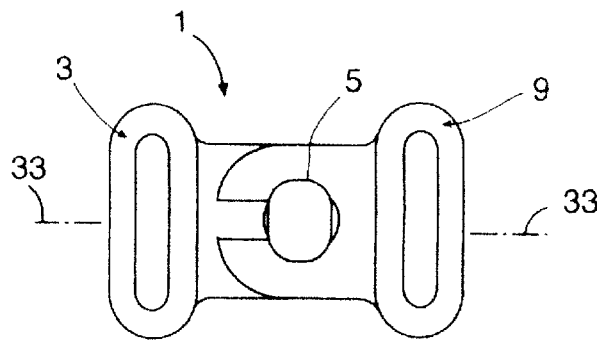
FIG. 8 is a top view of both halves in normal position while in use.

Referring to FIGS. 1, 7 and 8, the break-away buckle 1 of this invention is illustrated as being comprised of two members or halves. The male half 3 includes a keeper 5 which is adapted geometrically to the oval opening 7 in the female half 9 to allow keeper 5 to slide through oval opening 7 when the female half 9 is presented to the male half 3 at ninety degrees from the longitudinal axis as illustrated in FIG. 7. Oval opening 7 has at each end 11, 13 a radius that matches the radius of lug 15. Lug 15 is integral with and supports keeper 5. The diameter of lug 15 equals the width of keeper 5 which almost equals the width of oval opening 7 with allowance for clearance when oval opening 7 slides down to platform 17 over keeper 5. The radius at each end 11, 13 of oval opening 7 also almost matches the radius at each 19, 21 of keeper 5 with allowance for clearance when oval opening 7 slides down to platform 17 over keeper 5.

Figure 2:
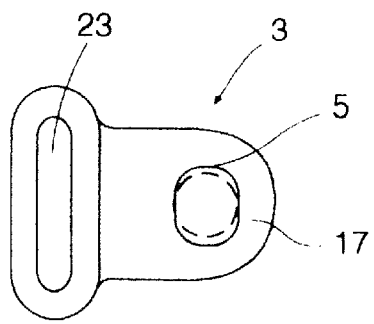
FIG. 2 is a top view of one of the two halves of the buckle, hereafter referred to as the male half.
Figure 3:
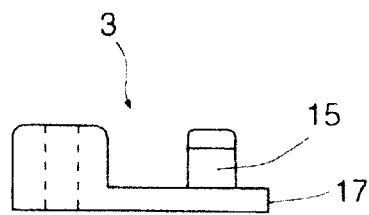
FIG. 3 is a side view of the male half in FIG. 2
Figure 4:
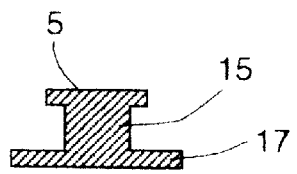
FIG. 4 is a cross sectional view of the male half in FIG. 3.
Figure 5:
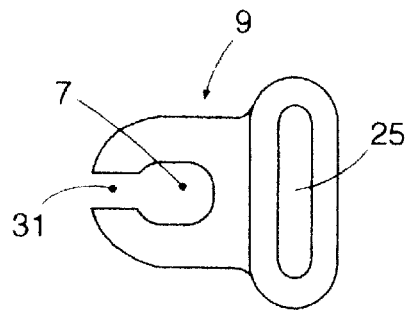
FIG. 5 is a top view of the second half hereafter referred to as the female half.
Figure 6:
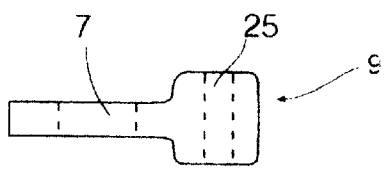
FIG. 6 is a side view of the female half in FIG. 5.

Referring to FIG. 2, the male half is illustrated as having an open slot 23 at one end of male half 3 to provide a strap connection. A corresponding slot 25 is provided at one end of female half 9 to provide a strap connection as shown in FIG. 5. Strap 27 is connected to strap connections 23 and 25 as is shown in FIG. 1.

Again referring to FIG. 1, the female half 9 has a gap 31 which serves the purpose of allowing jaws to spread open and release the female half 9 from the lug 15 when break-away tension is applied. Further by increasing the width of gap 31, the amount of tension required to be sufficient for separation to occur is less. Conversely, by decreasing the width of gap 31, the amount of tension necessary for separation is increased. This constitutes the tensional adjustment modification necessary for various sizes of animals.

Referring again to FIG. 1, it has been stated that oval opening 7 has at either end a radius that matches the radius of lug 15, and almost matches the radius at either end of keeper 5 with allowance for clearance. This serves the following three functions.

The first function is that it allows force free engagement at ninety degrees either way from the longitudinal axis (See FIG. 7). If the geometry at either end of oval opening 7 was dissimilar and keeper 5 were to match this dissimilarity, it would be possible to engage the two halves at ninety degrees one way but not either way. This function serves to make the two halves easier to engage or disengage when so desired. This ninety degree angle is presently in the preferred design but could be designed at any angle greater or less than 90 ninety degrees except at 0 degrees longitudinal center line with similar results.

The second function of this corresponding radius geometry is that the radius on oval opening 7 that intersects gap 31 is the load bearing surface when under tension. In matching the geometry of lug 15, it tends to grip more firmly than if the geometry were dissimilar. It tends to hold the two halves together correctly until the break-away tension is applied, keeping the two halves from becoming and staying partially disengaged under less than desirable tension as might happen if a wedge shaped design was used instead.

The third function is that the corresponding radius geometry of lug 15 and oval opening 7 allow the two halves to swivel about the center of the radius of the break-away buckle. This allows twisting of the break-away buckle without a corresponding, or holding force which might prevent the break-away buckle from separating when the break-away tension is applied.

Hence the pre-determined break-away tension can separate the two halves at any degree of rotation in the plane of the break-away buckle up to ninety degrees either way. At that point the male half 3 of the and the female half 9 of the break-away buckle come into contact with each other to prevent further rotation. It is not anticipated that this will occur while the break-away buckle is in use.

Referring to FIG. 8, it is illustrated that keeper 5 serves the function of maintaining the connection of the male half 3 and the female half 9 while in normal use. The longitudinal axis 33 of the break-away buckle 1 runs through the continuous center line of both halves from left to right across FIG. 8. Twisting of the female half 9 with respect to male half 3 around longitudinal center line 33 causes separation of the two halves. The amount of torque required for the separation is determined by the length and thickness of keeper 5 with respect to the width of opening 7. The length, thicknesses and width can be varied to any desired break-away torque.

Figure 9:
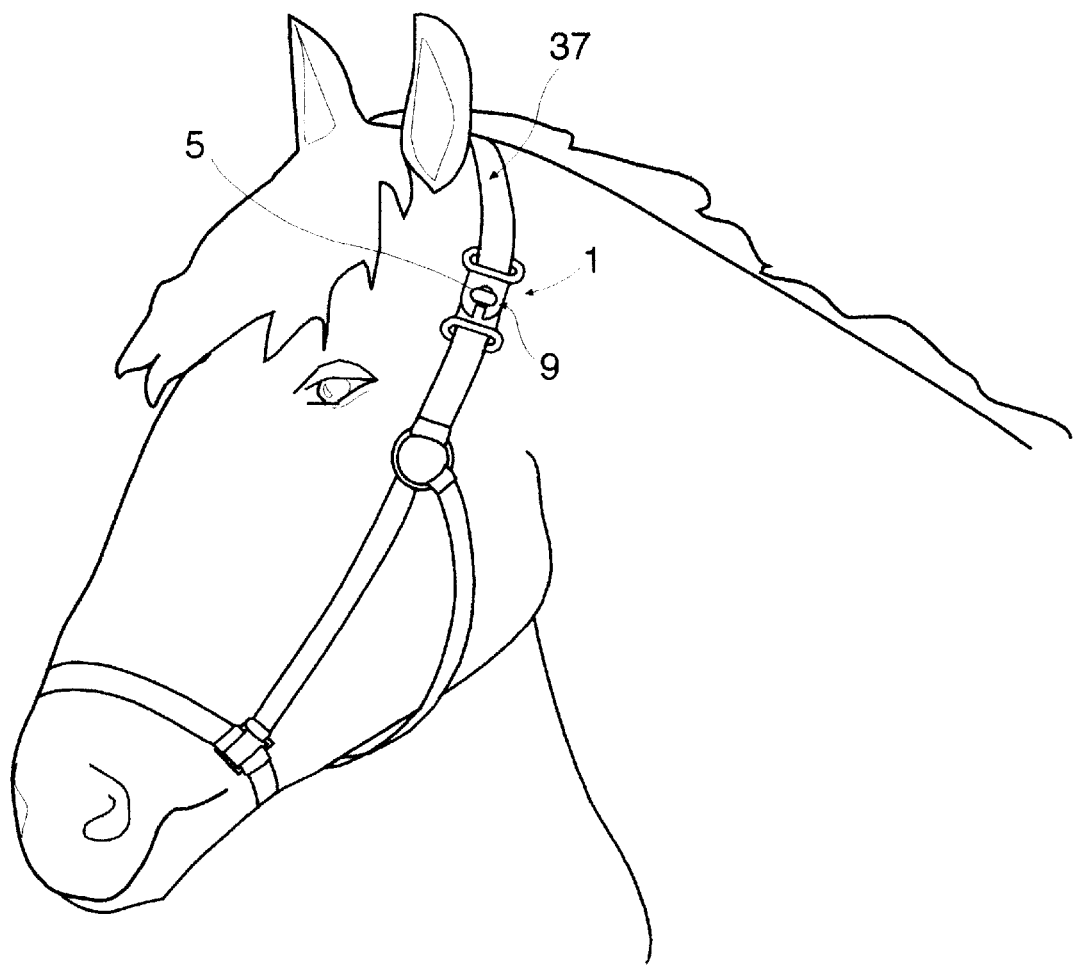
FIG. 9 is a view of the break-away buckle im a halter for a horse.

The break-away buckle 1 can be used in horse halter 37 of FIG. 9. When the halter 37 becomes entangled on an object, either torque and/or tension will cause keeper 5 to be released from female half 9.

Figure 11:
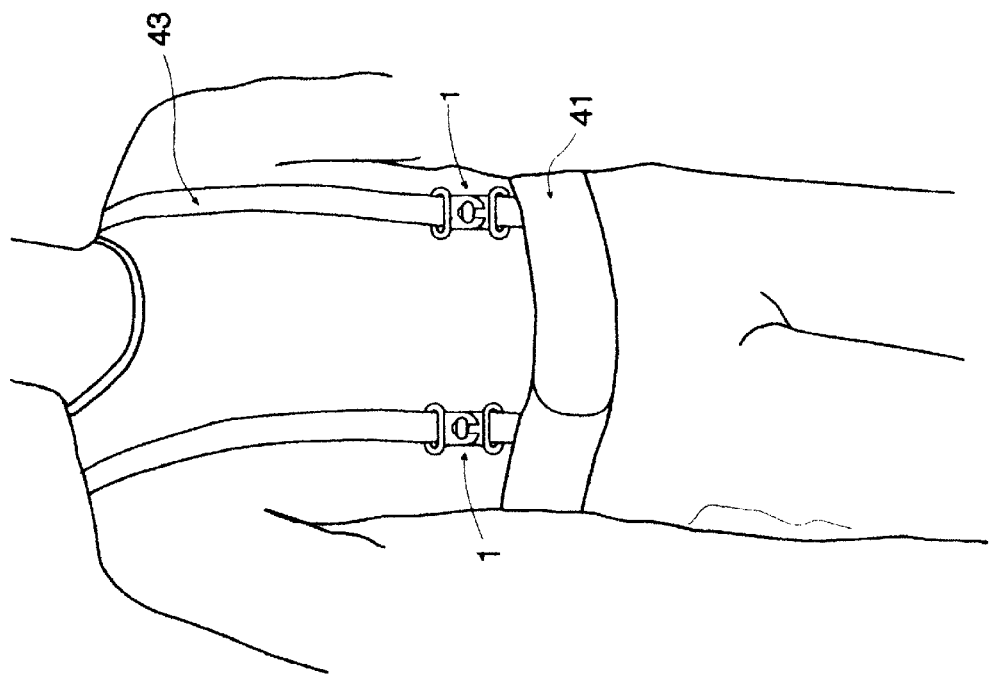
FIG. 11 is a view of the break-away buckle in suspenders attached to a back support belt.
Figure 10:
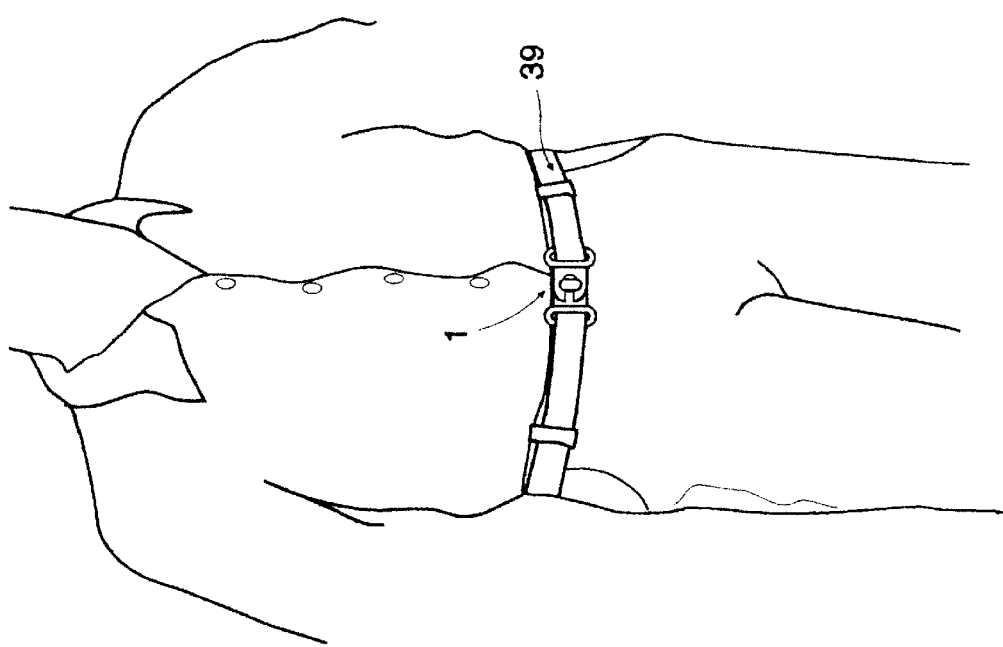
FIG. 10 is a view of the break-away buckle in a belt.

Another use for the break-away buckle 1 of the present invention is in a belt 39 as is shown in FIG. 10. While working around machinery there is always the danger of clothing being caught in the moving machinery and dragging the individual into the machine. Break-away buckle 1 will allow belt 39 to be opened freeing the wearer from his or her belt and hopefully the remainder of the entangled clothing. The same is true of back support belt 41 supported by suspenders 43 of FIG. 11. Should suspenders 43 become entangled in moving machinery, break-away buckles 1 would separated freeing the wearer from the suspenders 43.

Figure 12:
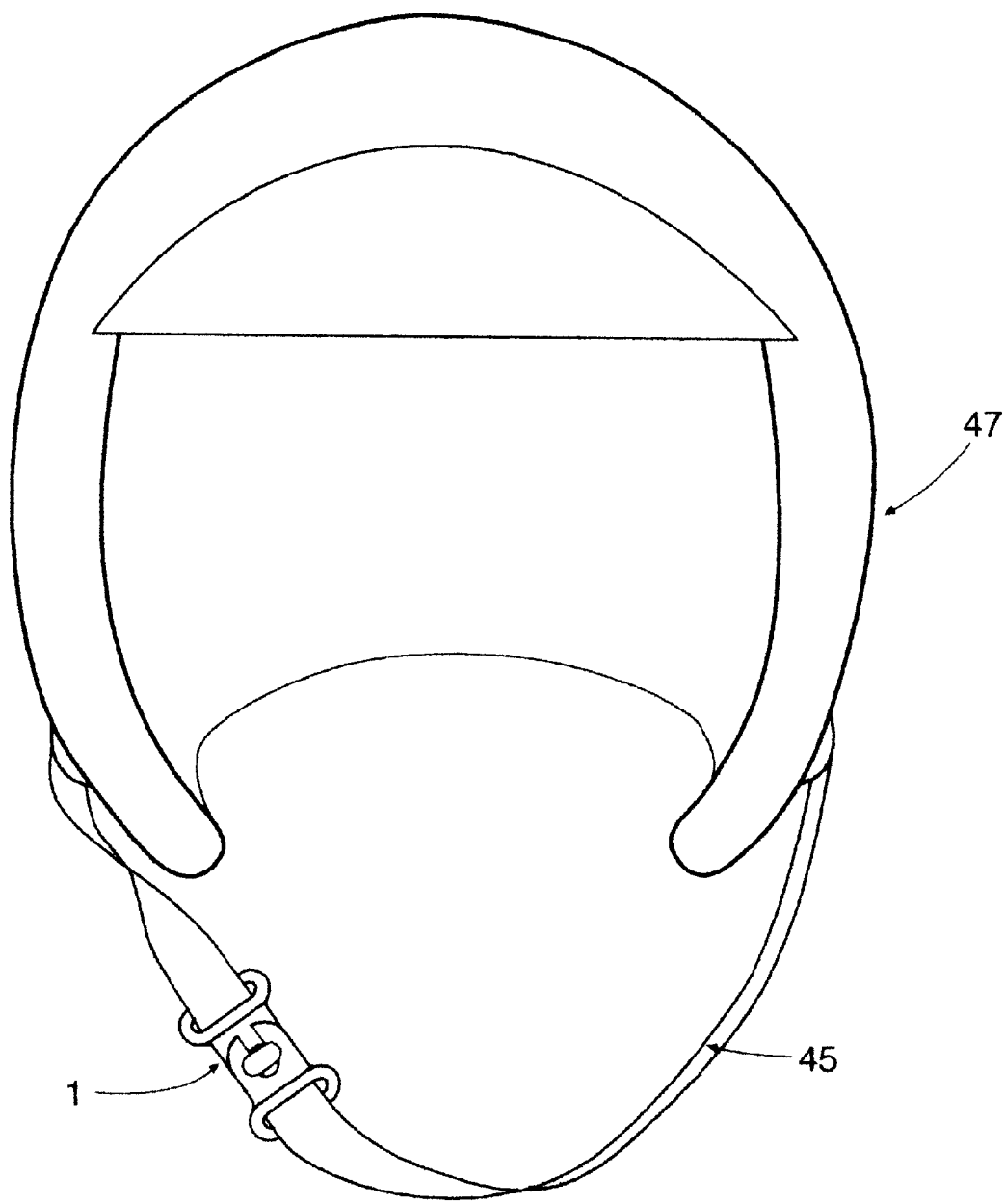
FIG. 12 is a view of the break-away buckle in a motorcycle helmet strap.

In motorcycle accidents, there is always the danger that the helmet of the rider could be caught on an object while the rider is traveling at high speed. The conventional helmet strap could then snap the riders neck or decapitate the rider's head. With the break-away buckle 1 in helmet strap 45, the helmet 47 would be removed by the catching object and save the rider's neck. This improvement is shown in FIG. 12.

The break-away buckle 1 of the present invention can be used alone or in combination with a conventional buckle in its various applications.

In this description of embodiments the present invention has been specifically illustrated and described in reference to the illustrations. It may be desirable to modify description but without alteration of the basic functions they represent. The description and drawings are intended to be functional in design but not abstract in nature.

What is claimed is:

1. A safety release break-away buckle for detachably connecting first and second halves of the break-away buckle relative to each other, the buckle connecting first and second ends of a strap, the buckle consisting essentially of:

(a) a lug having a first end and a second end, the lug mounted at the first end on the first half, the lug having an outer contour and size;

(b) a non round keeper having a length and a width mounted on a second end of the lug;

(c) a resilient clamp mounted on the second half, the clamp having a pair of spaced apart first and second jaws, the jaws cooperatively defining a resilient tip portion;

i) a gap at the resilient tip portion of the jaws;

ii) a non round opening positioned in the resilient clamp, the non round opening being in communication with the resilient tip portion, the non round opening being dimensioned with a width and length to receive the non round keeper of the lug even after twisting said safety release will still be released, when the opening and the keeper are in alignment, the width of the opening being less than the length of the keeper in at least one area of non alignment;

iii) the tip portion being contoured to be smaller than the outer contour and size of the lug, but sufficiently resilient to allow the lug to pass through when a predetermined tension is applied to the safety release break-away buckle in order to free the wearer from said strap.

2. The break-away buckle of claim 1 wherein the non round keeper and the non round opening are not in alignment when in use.

3. The break-away buckle of claim 1 wherein the non round keeper and the non round opening is correspondingly elongated.

4. The break-away buckle of claim 1 wherein the keeper is elongated and the non round opening is correspondingly elongated.

5. The break-away buckle of claim 1 wherein the lug outer contour has a round shape.

6. The break-away buckle of claim 1 wherein the break-away buckle is attached to a pet collar.

7. The break-away buckle of claim 1 wherein the break-away buckle is attached to an animal halter.

8. The break-away buckle of claim 1 wherein the break-away buckle is attached to an article of clothing.

9. The break-away buckle of claim 1 wherein the break away buckle is attached to a helmet strap.

10. The combination of an animal collar and a safety release break-away buckle for detachably connecting first and second halves of the break away buckle relative to each other, the buckle connecting first and second ends of the collar and positioned in the collar, the break-away buckle consisting essentially of:

(a) a lug having a first end and a second end, the lug mounted at the first end on the first half, the lug having an outer contour and size;

(b) a non round keeper having a length and a width mounted on a second end of the lug;

(c) a resilient clamp mounted on the second half, the clamp having a pair of spaced apart first and second jaws, the jaws cooperatively defining a resilient tip portion;

i. a gap at the resilient tip portion of the jaws;

ii. a non round opening positioned in the resilient clamp, the non round opening being in communication with the resilient tip portion, the non round opening being dimensioned with a width and length to receive the non round keeper of the lug, even after twisting said safety release will still be released, when the opening and the keeper are in alignment, the width of the opening being less than the length of the keeper in at least one area of non alignment;

iii. the tip portion being contoured to be smaller than the outer contour and size of the lug, but sufficiently resilient to allow the lug to pass through when a predetermined tension is applied to the said safety release break-away buckle, in order to free a wearer from said collar.

11. A break-away dog collar having a break-away-buckle of claim 10 wherein a conventional buckle is present in the collar in addition to the break-away buckle.

12. The combination of an animal halter and a safety release, break-away-buckle for detachably connecting first and second halves of the break away buckle relative to each other, the buckle connecting first and second ends of a halter strap positioned in the halter, the break-away buckle, consisting essentially of:

(a) a lug having a first end and a second end, the lug mounted at the first end on the first half, the lug having an outer contour and size;

(b) a non round keeper having a length and a width mounted on a second end of the lug;

(c) a resilient clamp mounted on the second half, the clamp having a pair of spaced apart first and second jaws, the jaws cooperatively defining a resilient tip portion;

i. a gap at the resilient tip portion of the jaws;

ii. a non round opening positioned in the resilient clamp, the non round opening being in communication with the resilient tip portion, the non round opening being dimensioned with a width and length to receive the non round keeper of the lug, even after twisting said safety release will still be opened, when the opening and the keeper are in alignment, the width of the opening being less than the length of the keeper in at least one area of non alignment;

iii. the tip portion being contoured to be smaller than the outer contour and size of the lug, but sufficiently resilient to allow the lug to pass through when a predetermined tension is applied to the safety release break-away buckle in order to free the wearer from said strap.

* * * * *